United States Patent [19]

Harvey

[11] Patent Number: 5,055,867
[45] Date of Patent: Oct. 8, 1991

[54] STILL CAMERA WITH ENHANCED MULTIPLE FRAME BURST CAPABILITY

[75] Inventor: Donald M. Harvey, Webster, N.Y.
[73] Assignee: Eastman Kodak Company, Rochester, N.Y.
[21] Appl. No.: 562,363
[22] Filed: Aug. 1, 1990
[51] Int. Cl.$^5$ ............................ G03B 1/12; G03B 1/24
[52] U.S. Cl. ................................. 354/173.11; 354/213
[58] Field of Search ................. 354/173.1, 173.11, 213

[56] References Cited

U.S. PATENT DOCUMENTS 3,677,159 7/1972 Studley ........................... 95/31 EL Primary Examiner—Michael L. Gellner
Attorney, Agent, or Firm—Millen, White & Zelano

[57] ABSTRACT

A still camera provides for multiple-frame bursts of sequential exposures while continuously rotating a film take-up spool by creating slack in the filmstrip just upstream of the take-up spool. Subsequent to creating the slack in the take-up spool, a film metering sprocket, which is positively engaged by the filmstrip, is abruptly stopped to arrest motion of the filmstrip so that a frame may be exposed. The exposure time is substantially less than the time required for the take-up spool to wind in the slack. Indexing of the film is accomplished by a pivoted arm which engages both the film and the periphery of a cam rotatable with the metering sprocket. The pivoted arm both creates slack in the film which allows the take-up spool to run continuously and stops rotation of the sprocket to permit exposure of the film.

23 Claims, 4 Drawing Sheets 5,055,867

STILL CAMERA WITH ENHANCED MULTIPLE FRAME BURST CAPABILITY

BACKGROUND OF THE INVENTION

This invention relates to still cameras having multiple frame burst capability and, more particularly, to still cameras and methods of operating still cameras wherein the number of sequential exposures per multiple frame burst is increased.

Thirty-five millimeter still cameras having the capability for fully automatic, movie-like bursts of sequential exposures have long been known. In accordance with conventional practices, bursts of sequential exposures are usually accomplished by simply speeding up the normal film-exposing functions of starting a film drive motor to transport a frame, stopping the drive, and exposing the frame. In amateur cameras, this is usually accomplished at a cyclic rate of one or two frames/second. For cameras utilized by professionals, auxiliary winders have been incorporated in order to increase the rate.

In most cameras, it is necessary to start and stop the take-up drive between exposures. For example, in U.S. Pat. No. 4,034,388, a clutch is engaged to advance a filmstrip and disengaged prior to exposing the filmstrip. As is also evident from U.S. Pat. No. 4,034,388, torque is maximized and motor size minimized by gearing down the motor output to the take-up spool and having a motor with an armature that rotates at very high speed. In some still cameras, the motor speed is reduced prior to stopping the film. Since exposures are usually in the 10 ms range, disengaging or slowing down the motor consumes at least an order of magnitude more time than exposing the film. Accordingly, there is an opportunity to increase the number of exposures per second by altering the way in which the filmstrip is started and stopped.

SUMMARY OF THE INVENTION

In view of the aforementioned considerations, it is an object of the instant invention to increase the rate of sequential exposures during multi-frame burst operation of still cameras.

In view of this and other objects, the instant invention contemplates a still camera with a take-up spool which rotates continuously during a multi-frame burst while the film is indexed via controlling a metering sprocket driven by the film as the film is advanced.

The metering sprocket is cycled between a rotating mode and stopped mode by an indexing mechanism, which intermittently both creates slack in the filmstrip and stops rotation of the metering sprocket so as to arrest motion of the filmstrip for exposure of a frame. The slack is wound on the continuously rotating take-up spool during exposure of the frame. Once the slack is removed, tension is restored to the filmstrip to again rotate the metering sprocket and effect operation of the indexing mechanism.

The method of the invention contemplates continuously accumulating film on a take-up spool during a multi-frame exposure burst in a still camera while allowing intermittent stopping of a portion of the film upstream of a metering sprocket by cyclically generating slack in the filmstrip downstream of the metering sprocket.

In accordance with a more specific embodiment of the invention, during multi-frame bursts of sequential exposures, a still camera continuously winds exposed filmstrip on a take-up spool by: creating slack in the filmstrip just upstream of the take-up spool and then stopping rotation of a metering sprocket to expose film upstream of the metering sprocket while the take-up spool winds in the slack. An indexing mechanism driven by the metering sprocket is used to create the slack between the take-up spool and the metering sprocket. The indexing mechanism also serves to positively stop the metering sprocket so as to permit still exposure of filmstrip upstream of the metering sprocket.

In accordance with a still more specific embodiment of the invention, the indexing mechanism for both intermittently creating the slack and interrupting rotation of the metering sprocket comprises an arm pivoted adjacent to the metering sprocket and a cam on the metering sprocket which interacts with the arm. The arm has a roller thereon for deflecting portions of the filmstrip downstream of the metering sprocket to create slack and a cam follower thereon for engagement with the cam rotatable with the metering sprocket. The cam has a profile which, during a portion of each cycle, first causes the arm to deflect the filmstrip an increasing distance from the filmstrip's normal path and then abruptly allows the arm to drop away from the filmstrip into a detent in the cam momentarily stopping the metering sprocket after sufficient slack has been accumulated. Since each exposure is on the order of 10 msec, there is adequate time to settle down the stopped portion of the filmstrip prior to operating a shutter to expose the film.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
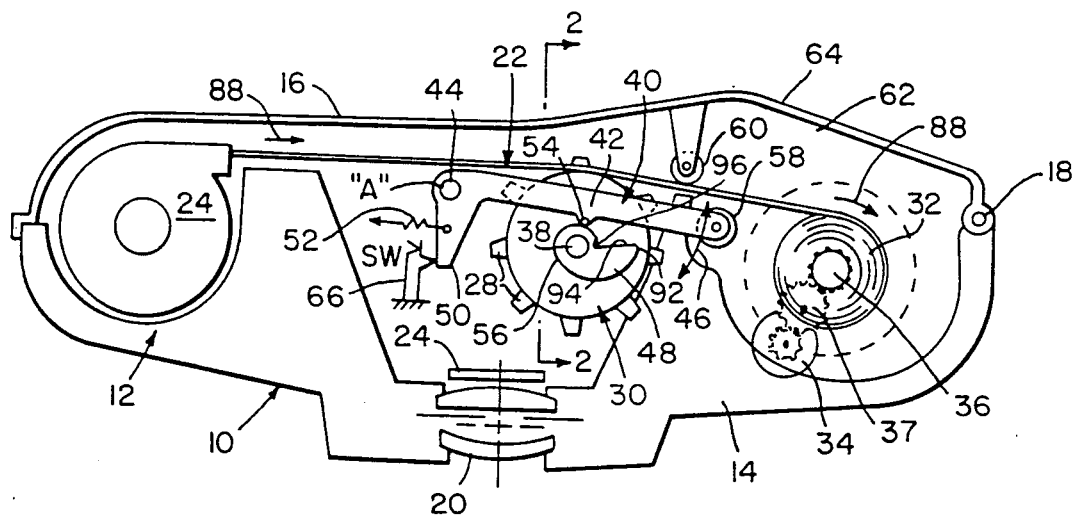
FIG. 1 is a top view of a still camera incorporating the features of the instant invention with a portion of the camera deleted for clarity.
Figure 2:
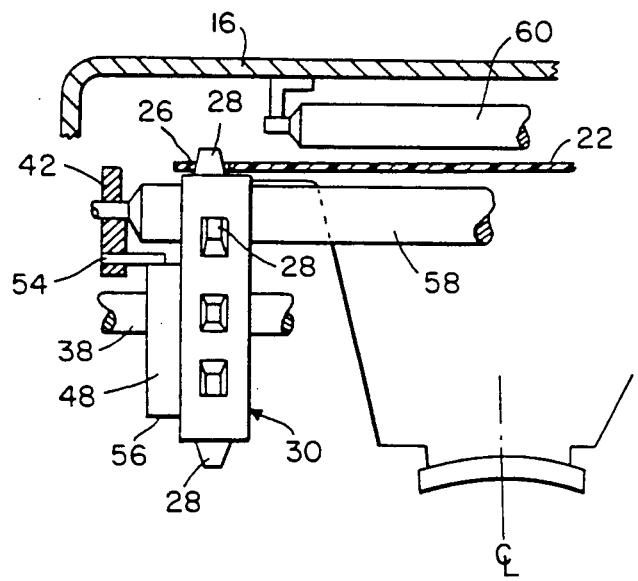
FIG. 2 is a cross section taken along lines 2—2 of FIG. 1.

Referring now mainly to FIGS. 1 and 2, there is shown a still camera, designated by the numeral 10 which, in accordance with the illustrated embodiment, is a 35 mm still camera for amateur use. The still camera 10 comprises a housing, designated generally by the numeral 12, with a front cover 14 and a rear cover 16 pivoted to the front cover by a hinge 18. The front cover 14 has a conventional lens 20, which focusess images on a 35 mm filmstrip, designated generally by the numeral 22, when a shutter 24 is opened. The filmstrip 22 is advanced unexposed from a conventional cassette 24 and, as best shown in FIG. 2, has rows of aligned perforations 26 for receiving sprocket teeth 28 projecting from a film metering sprocket, designated generally by the numeral 30. Upstream of the metering sprocket 30 is a take-up spool 32 (FIG. 1), which is driven by a motor 34 geared to the spindle 36 of the take-up spool in a conventional fashion by gears 37.

As with most still cameras, rotation of the take-up spool 32 advances the filmstrip 22 and imparts a clockwise rotation to the metering sprocket 30, which is fixed to a spindle 38 journalled in the housing 12. In accordance with the principles of the instant invention, rotation of the film metering sprocket 30 is positively stopped while the take-up spool 32 continues to be positively driven by motor 34. This is accomplished by interaction of an indexing mechanism, generally designated by the numeral 40, which performs the dual function of causing an accumulation of excess film (slack 33, FIG. 6) between the metering sprocket 30 and take-up spool 32 and stopping advancement of the filmstrip upstream of the metering sprocket so that a frame of the filmstrip is stationary during exposure. While the filmstrip 32 is being exposed, the slack 33 (FIG. 6) is taken up by the take-up spool 32. After exposure, the slack 33 is taken up and the filmstrip becomes taut, causing the metering sprocket 30 to again be rotated counterclockwise, repeating the cycle. By virtue of this arrangement, the instant invention provides multiple frame bursts similar to motion picture footage for selected time intervals in which a greater number of sequential exposures are possible per unit time than with prior art arrangements.

Considering the indexing mechanism 40 more specifically, it is seen that the indexing mechanism 40 comprises an arm 42 which is mounted by a pivot 44 to oscillate in the direction of arrows 46 as the arm is driven by a cam 48 fixed with respect to the metering sprocket 30. The arm 42 has a leg 50 projecting therefrom which urges the arm to rotate counterclockwise about the pivot 44 due to tension from a spring 52 secured at one end to the arm 50 and at the other end to the housing 12. The spring 52 urges a cam follower 54 projecting from the arm 42 into engagement with the face 56 of the cam 48.

A first relatively large first roller 58 is journalled at the free end of arm 42 in juxtaposition with a relatively small second roller 60, which is fixed to the back cover 16 of the camera 10. Normally, the second roller 60 helps retain the filmstrip 22 in contact with the metering sprocket 30. As will be explained hereinafter, the large first roller 58 and the small second roller 60 cooperate to create slack in a slack box 62 formed by a bulge 64 in the back cover 16. In addition to providing a biasing force on the arm 42, the spring 52 constantly urges the leg 50 toward an electrical switch 66 which, when closed, causes the shutter 24 to open so as to expose a frame of the filmstrip 22 optically aligned with the lens 20 and shutter. Accordingly, it is seen that the indexing mechanism 40, which comprises the arm 42 and the cam 48, performs the functions of (1) creating slack 33 (FIG. 6) in the filmstrip 22 so that the spool 32 can be continuously driven by motor 34, (2) stopping rotation of the metering sprocket 30 to provide a still frame for exposure, and (3) activating the switch 66 to open the shutter 24.

Figure 3:
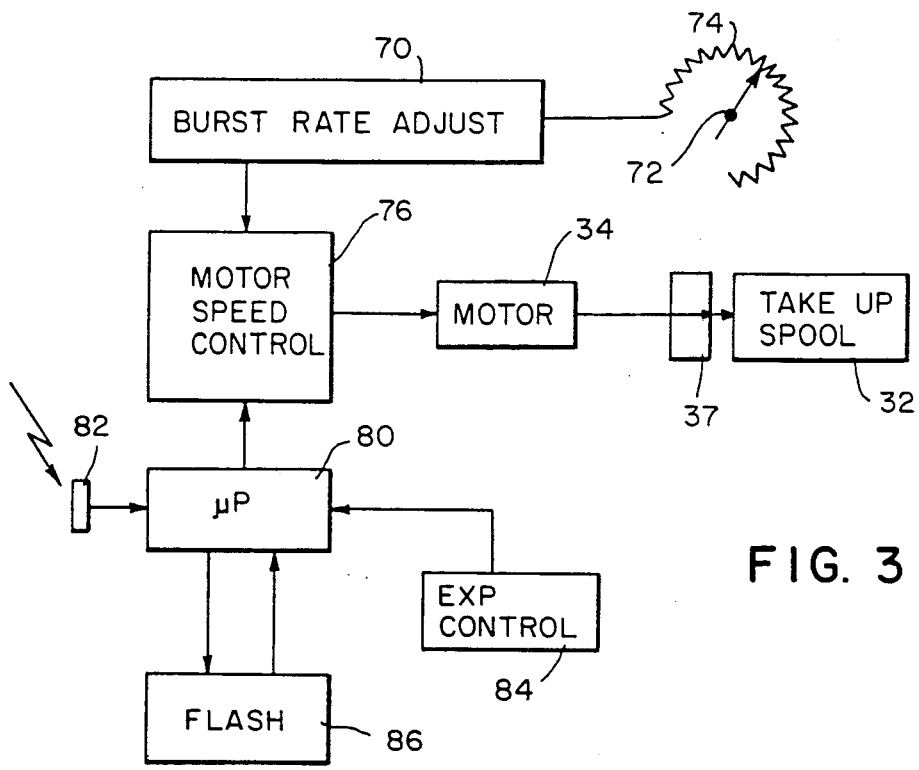
FIG. 3 is a block diagram schematically illustrating a control circuit for the still camera of the instant invention.

Referring now to FIG. 3, the multiple-frame burst mode is selected manually with a controller 70 which may, for example, utilize a dial 72 to select a setting on a resistance 74. For example, the frequency of the sequential exposures may be in the range: 1-5 frames/sec. as compared to amateur 35 mm cameras of the prior art which have a cyclic rate of only 1-2 frames/sec. The burst rate selected by controller 70 is fed to a conventional motor speed control 76, which controls the speed of the motor 34 which is in turn connected through the gear train 37 to the take-up spool 32. The motor speed control 76 also receives an input from a microprocessor 80 that has inputs from photocell 82, exposure control 84, and, if necessary, a light flash 86. The output of microprocessor 80 provides information in addition to the speed of the motor 34 which determines the maximum burst rate. For a given film slack 33 (FIG. 6), there is a maximum burst rate for each duration of the exposure and flash recycle time.

The following is an example of how the maximum frame rate is selected utilizing the control circuitry of FIG. 3:

$$\text{Max Frame Rate} = \frac{V_{Film}(IPS)\text{max}}{1.5''/\text{frame}}$$

$$\text{Max } V_{Film} = \frac{\text{Slack(in)}}{\text{Settle Time} + \text{Exposure Time (sec) or Flash Recharge, if req'd (sec)}}$$

Example:
Slack = .400 in
Settle = .050 sec
Expose = .010 sec $$\text{Max Frame Rate} = \frac{.400 \text{ in}}{1.5 \text{ in/frame} \cdot (.050 + .010 \text{ sec})} = 4.4 \text{ frames/sec}$$

Referring again to FIG. 1, after one has utilized the control 70 to select the burst rate, the camera 10 is activated to perform in its multiple-frame burst mode by pressing the exposure button 84 (FIG. 3), which causes the take-up spool 32 to rotate. This advances the filmstrip 22 in the direction of arrow 88. Since the sprocket teeth 28 on the metering sprocket 30 are meshed with the perforations 26 in the filmstrip 22, the metering sprocket starts clockwise rotation. As the metering sprocket 30 rotates, the cam 48 affixed thereto also rotates in a clockwise direction, lifting the cam follower 54 which is fixed to arm 42.

Figure 4:
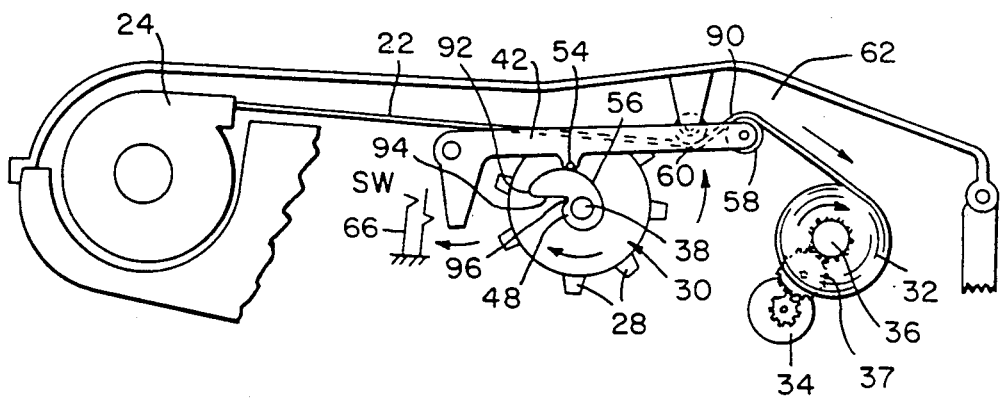
FIG. 4 is a top view of portion of the still camera of FIGS. 1 and 2, illustrating an interval in one cycle of a multiple-frame burst wherein the filmstrip is beginning to be accumulated to form slack.

As is seen in FIG. 4, rotation of the metering sprocket 30 and cam 48 lifts the arm 42, urging the large roller 58 against that portion 90 of the filmstrip 22 disposed downstream of the metering sprocket 30 and upstream of the take-up spool 32. As the large roller 58 lifts the downstream portion 90 of the filmstrip 22, the filmstrip bears against the small fixed roller 60, forming a hump in the filmstrip which is projected into the slack box 62.

Figure 5:
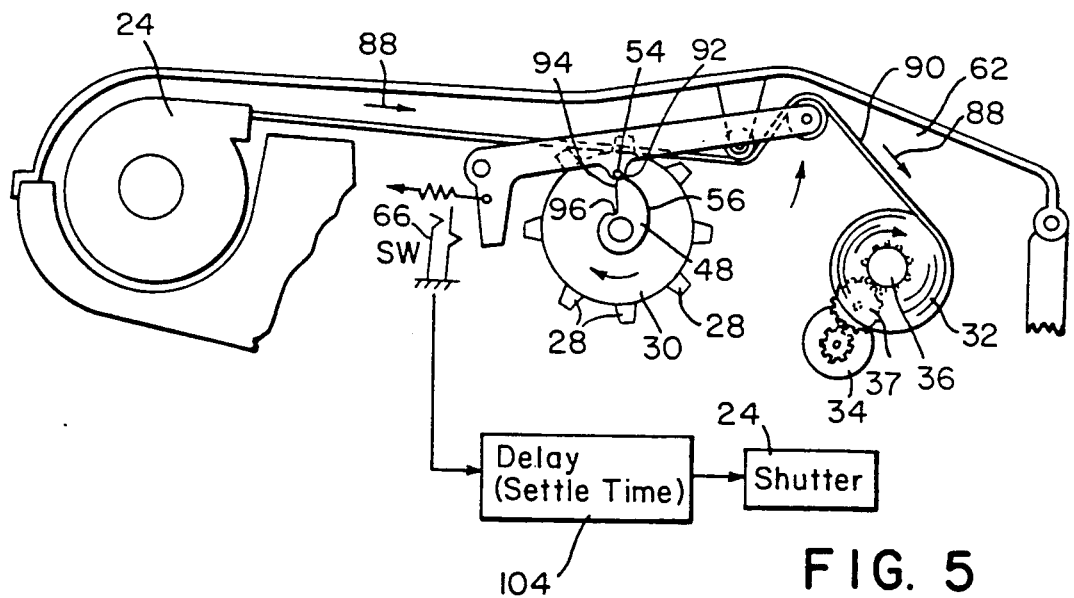
FIG. 5 is a view similar to FIG. 4, but showing a subsequent time in the cycle wherein the entire portion of the filmstrip from which the slack is comprised has been accumulated.

As is seen in FIG. 5, continued rotation of the metering sprocket 30 and cam 48 as the filmstrip 22 is pulled by the take-up spool 32 causes the amount of downstream film 90 accumulated in the take-up box 62 to increase. As is seen by arrow 88, the entire filmstrip 22 continues to move as the hump in the filmstrip accumulates in the slack box 62.

Figure 6:
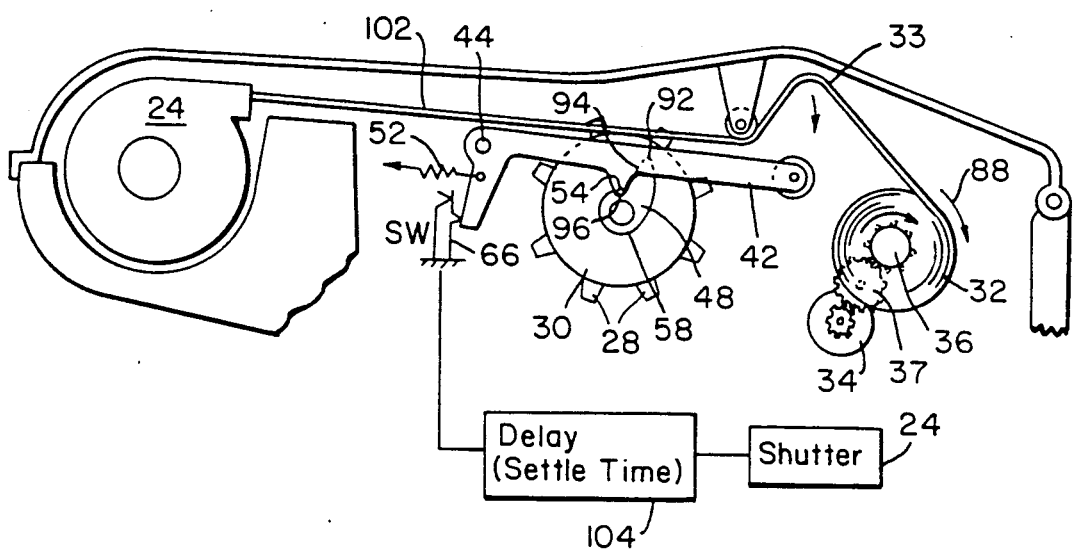
FIG. 6 is a view similar to FIGS. 4 and 5, wherein the accumulated portion of the filmstrip is free of engagement in order to create slack in the filmstrip and wherein a metering sprocket has been stopped by the follower on the arm resting in the detent portion of the cam to arrest motion of the filmstrip upstream of the metering sprocket.

Referring now to FIG. 6, once the cam follower 54 clears the peak 92 of the cam profile 56, the cam follower drops down an abrupt radial portion 94 of the cam profile due to force exerted by the spring 52, which rotates the arm 42 clockwise about pivot 44. This disengages the roller 58 from the downstream portion 90 of the filmstrip 22 and thereby creates the slack 33 in the filmstrip 22. After the arm 42 drops away from the filmstrip 22, the cam follower 54 seats in a V-shaped detent 96 which forms a stop surface at the bottom of the abrupt radial profile 94 of the cam 48. When the cam follower 54 seats in the V-shaped detent 96 of the cam 48, rotary motion of the metering sprocket 30 is immediately arrested so that portions 102 of the filmstrip 22 upstream of metering sprocket 30 stop, while the downstream portions 90, which have been accumulated in the slack 33, continue to move linearly in the direction of the arrow 88 so as to be wound on the take-up spool 32. The amount of film accumulated in the slack 33 is sufficiently large so that by the time the slack is consumed, sufficient time has elapsed for shutter 24 to have exposed the stationary downstream portion (or frame) 102 of the filmstrip 22 to record an image thereon. The time interval is large enough to accommodate a delay between the time that the switch 66 is closed and the shutter 24 opened. The delay is accomplished by a conventional delay circuit 104 disposed between the switch 66 and shutter 24 so as to provide settle time during which the filmstrip 22 stabilizes after being stopped. This settle time is approximately 0.050 seconds, which is considerably larger than the exposure time, which is on the order of 0.010 seconds.

Figure 7:
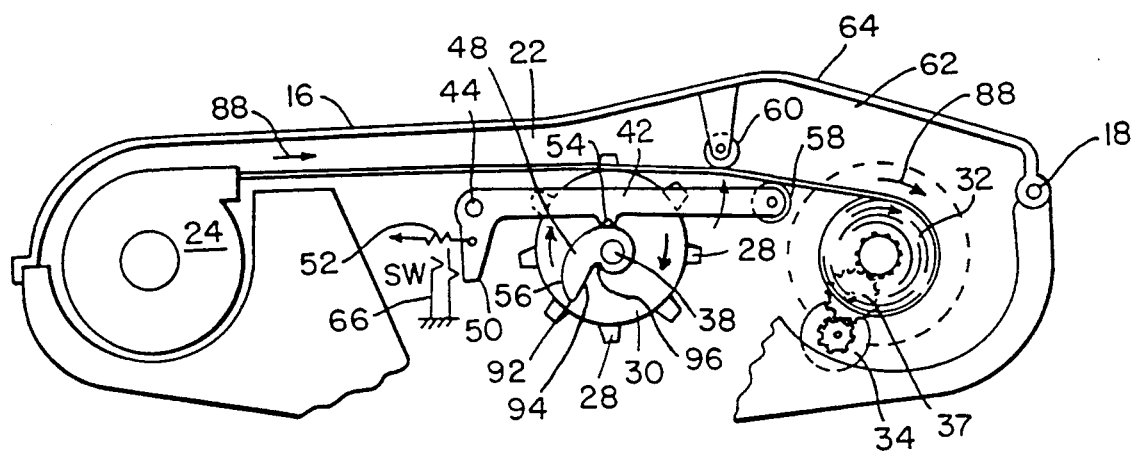
FIG. 7 is a view substantially similar to FIG. 1 after an exposure of the filmstrip, showing the take-up roller again accumulating exposed film while again advancing fresh film for exposure when the subsequent cycle arrives at the stop mode of FIG. 6.

As is seen in FIG. 7, once the slack 33 is removed from the filmstrip 22, the filmstrip becomes taut, overcoming the force retaining the cam follower 54 in the V-shaped detent 96 and initiating clockwise rotation of the metering sprocket 30. The arm 42 then begins its counterclockwise rotation to again engage the filmstrip 22 with the roller 58 so as to start another cycle. As the arm 42 rotates in a counterclockwise direction, it opens switch 66 so that the switch is ready for subsequent operation of the shutter 24. FIGS. 1 and 7 are similar, with FIG. 7 being further along in the cycle.

Figure 8:
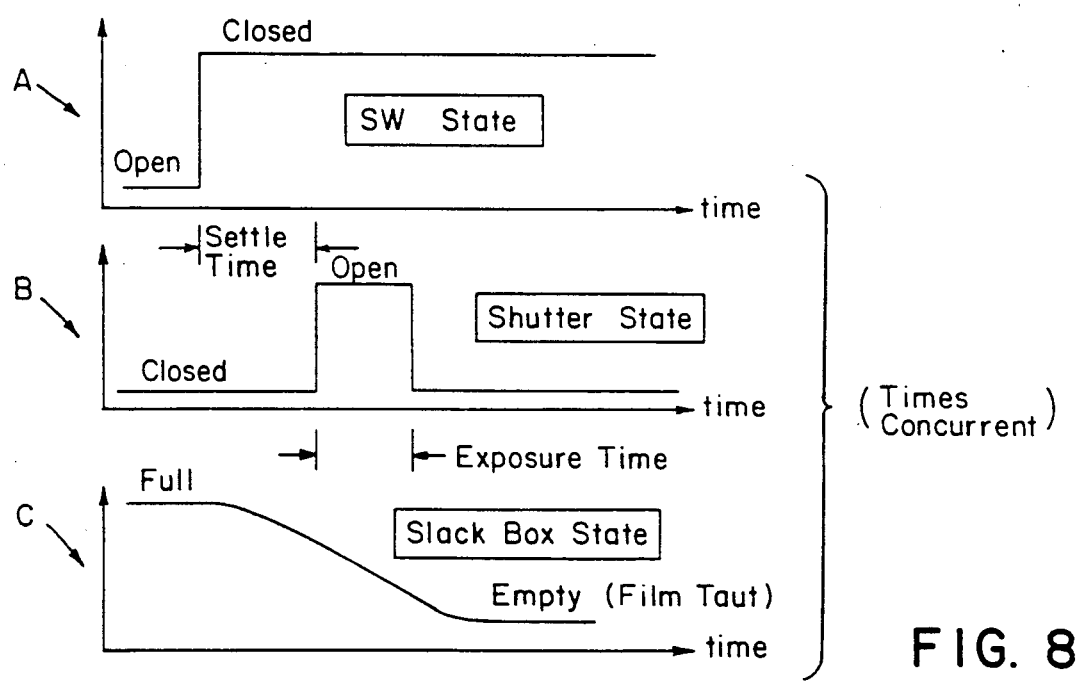
FIGS. 8A, 8B, and 8C are graphic representations illustrating the states of a shutter switch, a shutter, and the slack as a function of time.

In FIGS. 8A, 8B, and 8C, coordination of the switch 66, shutter 24, and slack 33 are related with respect to time. In FIG. 8A, the switch 66 is closed when the arm 42 drops from its FIG. 6 position to its FIG. 5 position and remains closed until the filmstrip 22 again becomes taut upon removal of the slack 33, as in shown in FIGS. 1 and 7. As is seen in FIG. 8B, closure of the switch 66 immediately tolls the settle time provided by the time delay 104, which settle time is approximately 0.050 seconds. Upon expiration of the settle time, the shutter 24 opens for perhaps 0.010 second to expose the still frame 102 of the filmstrip. As is seen in FIG. 8C, the slack box 62 is full when the arm 42 is at its maximum deflection in FIG. 5 and starts to empty when the arm drops the roller 58 away from the accumulated slack 33 (FIG. 6). The take-up spool 32 continues to wind the exposed filmstrip 22 until the slack box 62 is empty, and the filmstrip is taut (FIGS. 1 and 7). But, as seen upon comparing FIG. 8C with FIG. 8B, this occurs after the shutter 24 is closed.

Utilizing the aforedescribed features of the instant invention, wherein the indexing mechanism 40 cooperates with the continuously rotating take-up spool 32, multiple-frame bursts of up to about 4.4 frames/second are possible while utilizing a mechanism which is readily adaptable to technology ordinary used with amateur 35 mm still cameras.

Without further elaboration, it is believed that one skilled in the art can, using the preceding description, utilize the present invention to its fullest extent.

The entire disclosures of all applications, patents, and publications, cited herein, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A still camera comprising:

means for exposing successive frames of a filmstrip dispensed from a film supply and wound upon a take-up spool, the exposing means including a lens and shutter disposed to expose the successive frames between the film supply and the take-up spool;

means for rotating the take-up spool continuously for a selected time period sufficient to expose a plurality of frames;

a film metering sprocket disposed between the film supply and the take-up spool, the film metering sprocket being positively engaged with the filmstrip and being mounted for free rotation in order to be rotated as the take-up spool winds the filmstrip; and indexing means for periodically stopping rotation of the film metering sprocket for a time interval of sufficient length to expose a frame of the film, said indexing means including means for accumulating filmstrip of sufficient length to permit the take-up spool to continue winding while the frame is being exposed whereby multiple frames of the filmstrip are exposed during the selected time period.

2. The camera of claim 1, wherein the means for accumulating filmstrip comprises means for creating slack in the filmstrip.

3. The camera of claim 2, wherein the camera has a housing with a space provided therein for accommodating the slack created in the filmstrip.

4. The camera of claim 1, wherein the indexing means comprises an arm pivoted within the camera and a cam rotatable in conjunction with the metering sprocket, the arm including a cam follower in engagement with the cam and the cam including a profile surface engaged by the follower, the profile surface including a lifting surface for pivoting the arm against the film to accumulate film downstream of the film metering sprocket and a stop surface for stopping rotation of the film metering sprocket upon engagement with the cam follower.

5. The camera of claim 4, wherein the arm is configured to disengage from the film as the cam follower engages the stop surface, wherein the accumulated film becomes a slack in the filmstrip.

6. The camera of claim 5, wherein the arm includes means thereon for operating the shutter after engagement of the cam follower with the stop means.

7. The camera of claim 4, wherein the arm includes means thereon for operating the shutter after engagement of the cam follower with the stop means.

8. The camera of claim 7, further including an electrical switch disposed between the shutter operating means of the arm and the shutter, wherein closure of the electrical switch results in opening of the shutter.

9. The camera of claim 8, further including a time-delay circuit disposed between the switch and the shutter for delaying opening of the shutter for sufficient time to allow the frame stopped for exposure to mechanically settle prior to exposure.

10. A method of advancing film during a multiple-frame burst of sequential exposures in a still camera comprising:
    (a) continuously winding exposed film on a spool during the multiple frame burst;
    (b) accumulating a predetermined length of the filmstrip just upstream of the take-up spool during the multiple-frame burst;
    (c) stopping advancement of the filmstrip upstream of the predetermined length for an interval of time sufficient to expose a frame of the stopped filmstrip, the interval of time being less than the time required for the length of accumulated exposed film to be wound upon the take-up spool; and
    (d) repeating steps (b) and (c) while performing step (a).

11. The method of claim 10, further including generating an electrical signal upon stopping the film and using that electrical signal to operate an electrically operated shutter to expose the film.

12. The method of claim 11, further including allowing the film to mechanically settle before opening the electrically operated shutter by delaying transmission of the electrical signal to the electrically operated shutter.

13. The method of claim 12, wherein the accumulated lengths of film are in the form of slack in the filmstrip.

14. The method of claim 10, wherein the accumulated lengths of film are in the form of slack in the filmstrip.

15. An improvement in still cameras of the type which expose successive frames of a filmstrip by opening a shutter and focussing images through a lens onto the frames of the film strip; the film strip being dispensed from a film supply and wound upon a take-up spool while meshed with a metering sprocket disposed between the film supply and take-up spool to rotate the metering sprocket as the filmstrip advances, the improvement comprising: means for rotating the take-up spool continuously for a selected time period sufficient to expose a plurality of frames and indexing means for periodically stopping rotation of the film metering sprocket for a time interval of sufficient length to expose a frame of the film, said indexing means including means for accumulating filmstrip of sufficient length to permit the take-up spool to continue winding while the frame is being exposed whereby multiple frames of the filmstrip are exposed during the selected time period.

16. The improvement of claim 15, wherein the means for accumulating filmstrip comprises means for creating slack in the filmstrip.

17. The improvement of claim 16, wherein the camera has a housing with a space provided therein for accommodating the slack created in the filmstrip.

18. The improvement of claim 15, wherein the indexing means comprises an arm pivoted within the camera and a cam rotatable in conjunction with the metering sprocket, the arm including a cam follower in engagement with the cam and the cam including a profile surface engaged by the follower, the profile surface including a lifting surface for pivoting the arm against the film to accumulate film downstream of the film metering sprocket and a stop surface for stopping rotation of the film metering sprocket upon engagement with the cam follower.

19. The improvement of claim 18, wherein the arm is configured to disengage from the film as the cam follower engages the stop surface.

20. The improvement of claim 19, wherein the arm includes means thereon for operating the shutter after engagement of the cam follower with the stop means.

21. The improvement of claim 18, wherein the arm includes means thereon for operating the shutter after engagement of the cam follower with the stop means.

22. The improvement of claim 21, further including an electrical switch disposed between the shutter operating means of the arm and the shutter, wherein the closure of the electrical switch results in opening of the shutter.

23. The improvement of claim 22, further including a time-delay circuit disposed between the switch and the shutter for delaying opening of the shutter for sufficient time to allow the frame stopped for exposure to mechanically settle prior to exposure.

* * * * *